United States Patent
Miyairi et al.

(10) Patent No.: US 7,727,488 B2
(45) Date of Patent: Jun. 1, 2010

(54) PLASMA GENERATING ELECTRODE AND PLASMA REACTOR

(75) Inventors: Yukio Miyairi, Nagoya (JP); Yasumasa Fujioka, Nagoya (JP); Masaaki Masuda, Nagoya (JP); Takeshi Sakuma, Nagoya (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 1190 days.

(21) Appl. No.: 10/562,467

(22) PCT Filed: Jul. 7, 2004

(86) PCT No.: PCT/JP2004/009647

§ 371 (c)(1),
(2), (4) Date: Dec. 27, 2005

(87) PCT Pub. No.: WO2005/005798

PCT Pub. Date: Jan. 20, 2005

(65) Prior Publication Data

US 2006/0152133 A1    Jul. 13, 2006

(30) Foreign Application Priority Data

Jul. 10, 2003    (JP)    ............... 2003-195165

(51) Int. Cl.
*B01J 19/08*    (2006.01)
(52) U.S. Cl. .................. 422/186.04; 422/186; 204/164
(58) Field of Classification Search ............. 422/186.04
See application file for complete search history.

(56) References Cited

U.S. PATENT DOCUMENTS 4,472,174 A * 9/1984 Chuan ........................... 95/58

(Continued)

FOREIGN PATENT DOCUMENTS

JP    A 1-163413    6/1989

(Continued)

OTHER PUBLICATIONS

U.S. Appl. No. 10/561,840, filed Dec. 22, 2005, Miyairi et al.

(Continued)

*Primary Examiner*—Harry D Wilkins, III
*Assistant Examiner*—Bryan D. Ripa
(74) *Attorney, Agent, or Firm*—Oliff & Berridge, PLC

(57) ABSTRACT

A plasma generating electrode 1 of the present invention includes two or more electrodes 2 disposed to face each other, and holding members 3 for holding electrodes 2 at a predetermined interval, and can generate plasma by applying voltage between electrodes 2. At least one of electrodes facing each other 2 has a plate-shaped ceramic body 6 serving as a dielectric body, and a conductive film 7 disposed inside the body 6, and the holding members 3 fix the opposite side end portions 5 (fixed end portions 5a) of electrodes facing each other 2 in the state of a cantilever in such a condition that electrodes 2 are held by holding members in the state of cantilevers of the different directions alternately at a predetermined interval as a whole. This relaxes the thermal stress and effectively prevents distortion and breakage of electrodes caused by to a temperature change.

6 Claims, 10 Drawing Sheets

U.S. PATENT DOCUMENTS

| | | | |
|---|---|---|---|
| 6,146,599 A * | 11/2000 | Ruan et al. | 422/186.04 |
| 6,576,202 B1 * | 6/2003 | Chiu | 422/186.21 |
| 6,596,243 B1 * | 7/2003 | Fujii et al. | 422/177 |
| 6,887,440 B2 | 5/2005 | Nelson et al. | |
| 2002/0076363 A1 * | 6/2002 | Nelson et al. | 422/174 |
| 2002/0131916 A1 * | 9/2002 | Nelson et al. | 422/186.04 |

FOREIGN PATENT DOCUMENTS

| | | |
|---|---|---|
| JP | A 2001-164925 | 6/2001 |
| JP | A 2002-256851 | 9/2002 |
| JP | A 2002-256853 | 9/2002 |
| WO | WO 99/47242 A1 | 9/1999 |

OTHER PUBLICATIONS

U.S. Appl. No. 10/561,841, filed Dec. 22, 2005, Miyairi et al.
U.S. Appl. No. 10/562,597, filed Dec. 21, 2005, Miyairi et al.

* cited by examiner

PLASMA GENERATING ELECTRODE AND PLASMA REACTOR

TECHNICAL FIELD

The present invention relates to a plasma generating electrode and a plasma reactor. More specifically, the present invention relates to a plasma generating electrode and a plasma reactor having relaxed thermal stress and capable of preventing distortion and breakage of the electrode caused by a temperature change.

BACKGROUND ART

There have been known that silent discharge is caused by applying a high-voltage alternating current or a periodic pulse voltage on a dielectric body disposed between two electrodes fixed at both end portions to generate a plasma field, where an active species, a radical, and an ion are formed to promote reaction and decomposition of gas and that this can be used for removing harmful components contained in engine exhaust gas or exhaust gas from various kinds of incinerators.

For example, there is disclosed a plasma reactor which treats, e.g., $NO_x$, carbon particulate, HC, and CO contained in engine exhaust gas or exhaust gas from various kinds of incinerators by passing the engine exhaust gas or exhaust gas from various kinds of incinerators through the plasma field (see, e.g., JP-A-2001-164925).

DISCLOSURE OF THE INVENTION

However, there was a problem of deformation or breakage of a plasma generating electrode disposed inside a plasma reactor due to thermal stress in the case of treating exhaust gas having high temperature, such as engine exhaust gas. In addition, in the case that the electrodes facing each other are made of different materials, stress is caused due to difference in thermal expansion amount of each material to cause a problem of breakage of the plasma generating electrode.

The present invention has been made in view of the above problems and provides a plasma generating electrode having relaxed thermal stress and a plasma reactor.

To achieve the above aim, according to the present invention, there is provided the following plasma generating electrode and a plasma reactor.

[1] A plasma generating electrode comprising:

two or more electrodes disposed to face each other, and holding members for holding the electrodes at a predetermined interval, and capable of generating plasma by applying voltage between the electrodes;

wherein at least one of the electrodes facing each other has a plate-shaped ceramic body serving as a dielectric body and a conductive film disposed inside the ceramic body, and the holding members fix the opposite side end portions (fixed end portions) of the electrodes facing each other in the state of a cantilever in such a condition that the electrodes are held by holding members in the state of cantilevers of the different directions alternately at a predetermined interval as a whole.

[2] A plasma generating electrode according to the above [1], wherein the holding members have a large number of first groove portions to insert free end portions opposite to fixed end portions of the electrodes therein with a predetermined gap on each surface opposing to the free end portions.

[3] A plasma generating electrode according to the above [2], wherein the holding members each comprises a unitary first comb-shaped member having the first grooves as comb teeth and a unitary second comb-shaped member having a second grooves as comb teeth, the first comb-shaped member and the second comb-shaped member having shapes complementary to each other; the free end portions of the electrodes are inserted into the first grooves of the first comb-shaped member; and the fixed end portions of the electrodes are fixed to the second grooves of the second comb-shaped member in the state of a cantilever.

[4] A plasma generating electrode according to the above [3], wherein each of the fixed end portions of the electrodes is fixed, with an adhesive agent, to each of the second grooves of the second comb-shaped member in the state of a cantilever.

[5] A plasma generating electrode according to any one of [1] to [4], which further comprises a connection terminal for electrical connection to the fixed end portions of the electrodes.

[6] A plasma generating electrode according to the above [5], wherein a main component of the connection terminal is metal having a thermal expansion coefficient of $7\times10^{-6}(1/K)$ at 0 to 600° C. or less.

[7] A plasma generating electrode according to the above [5] or [6], wherein the connection terminal is connected to the fixed end portions of the electrodes by welding, brazing, or diffusion bonding.

[8] A plasma generating electrode according to the above [5], wherein the connection terminal is formed by plating of a conductive layer on the fixed end portions of the electrodes.

[9] A plasma reactor comprising a plasma generating electrode according to any one of [1] to [8] and a case body having a passage of gas containing a predetermined component, and being capable of making the predetermined component contained in the gas react with plasma generated by the plasma generating electrode when the gas is introduced into the case body.

[10] A plasma reactor according to the above [9], which further comprises a honeycomb structure having a plurality of cells separated by partition walls and disposed on upstream side of the plasma generating electrode in the passage of the case body.

Since the holding members thus hold electrodes in the state of cantilevers of the different directions alternately at a predetermined interval as a whole, thermal stress is relaxed to effectively inhibit distortion or breakage of each electrode even in the case that the plasma generating electrode is heated at a high temperature or that a local temperature difference is caused by high-temperature exhaust gas discharged from an automobile engine. Further, since a plasma reactor of the present invention is provided with such a plasma generating element, it can generate uniform and safe plasma and is excellent in thermal resistance.

BEST MODE FOR CARRYING OUT THE INVENTION

Embodiments of a plasma generating electrode and a plasma reactor of the present invention are hereinafter described in detail with referring to drawings. However, the present invention should not be construed with limiting to these embodiments, and various changes, modifications, and improvements can be given on the basis of knowledge of those skilled in the art as long as they do not deviate from the scope of the present invention.

Figure 1:
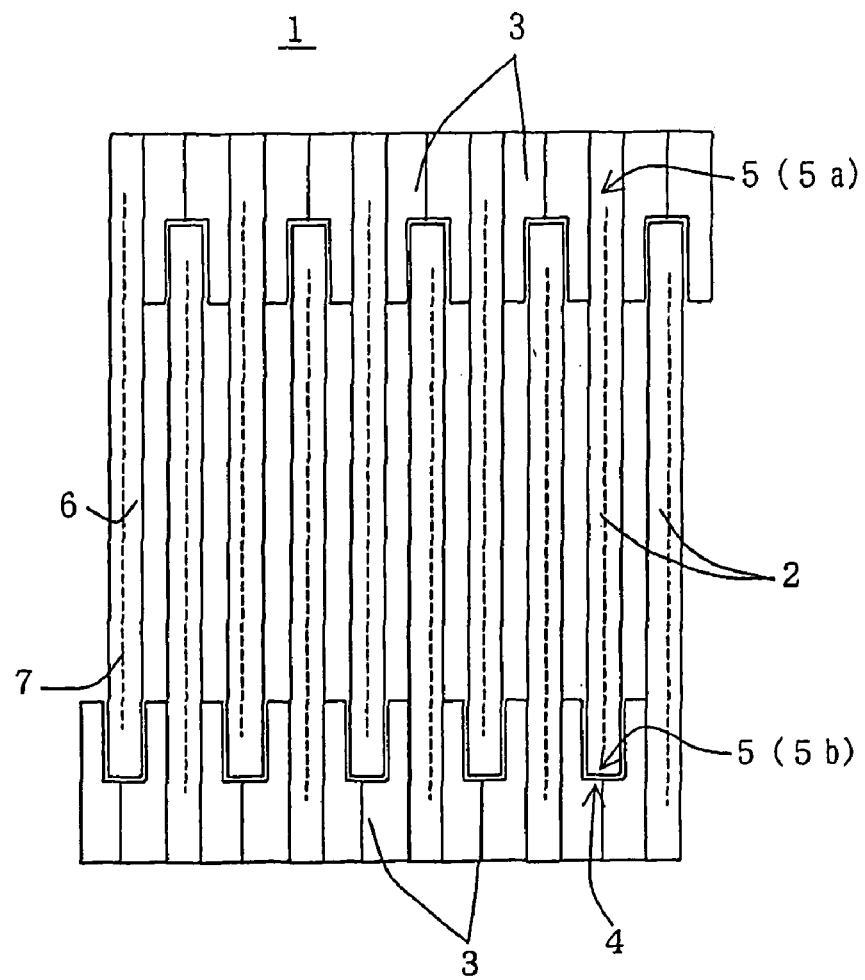
FIG. 1 is a schematic view showing constitution of an embodiment of a plasma generating electrode of the present invention.
Figure 2:
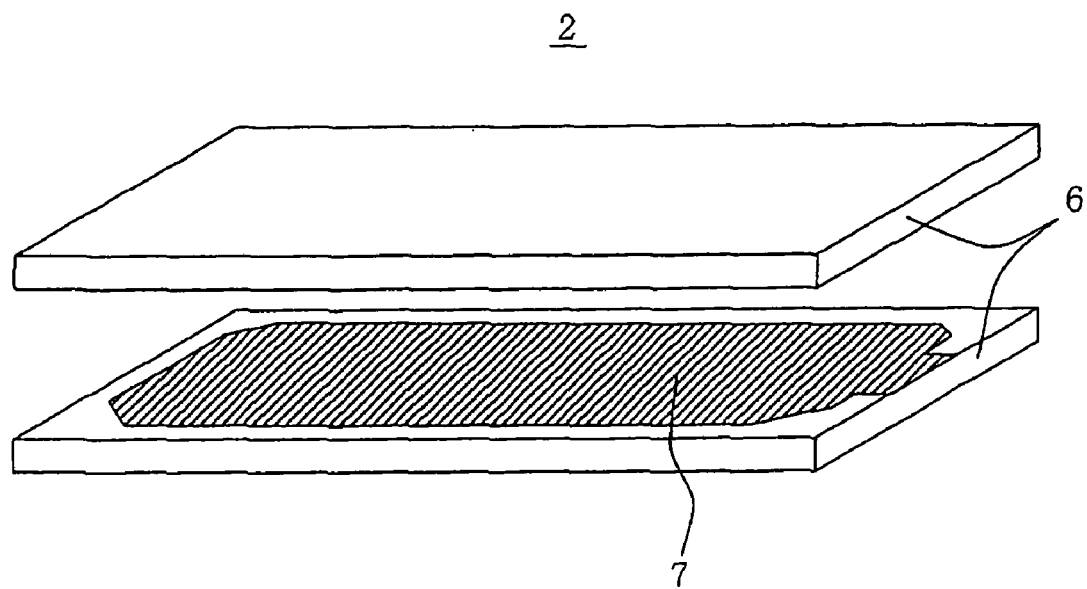
FIG. 2 is a schematic view schematically showing the inside of an electrode used for an embodiment of a plasma generating electrode of the present invention.
Figure 3:
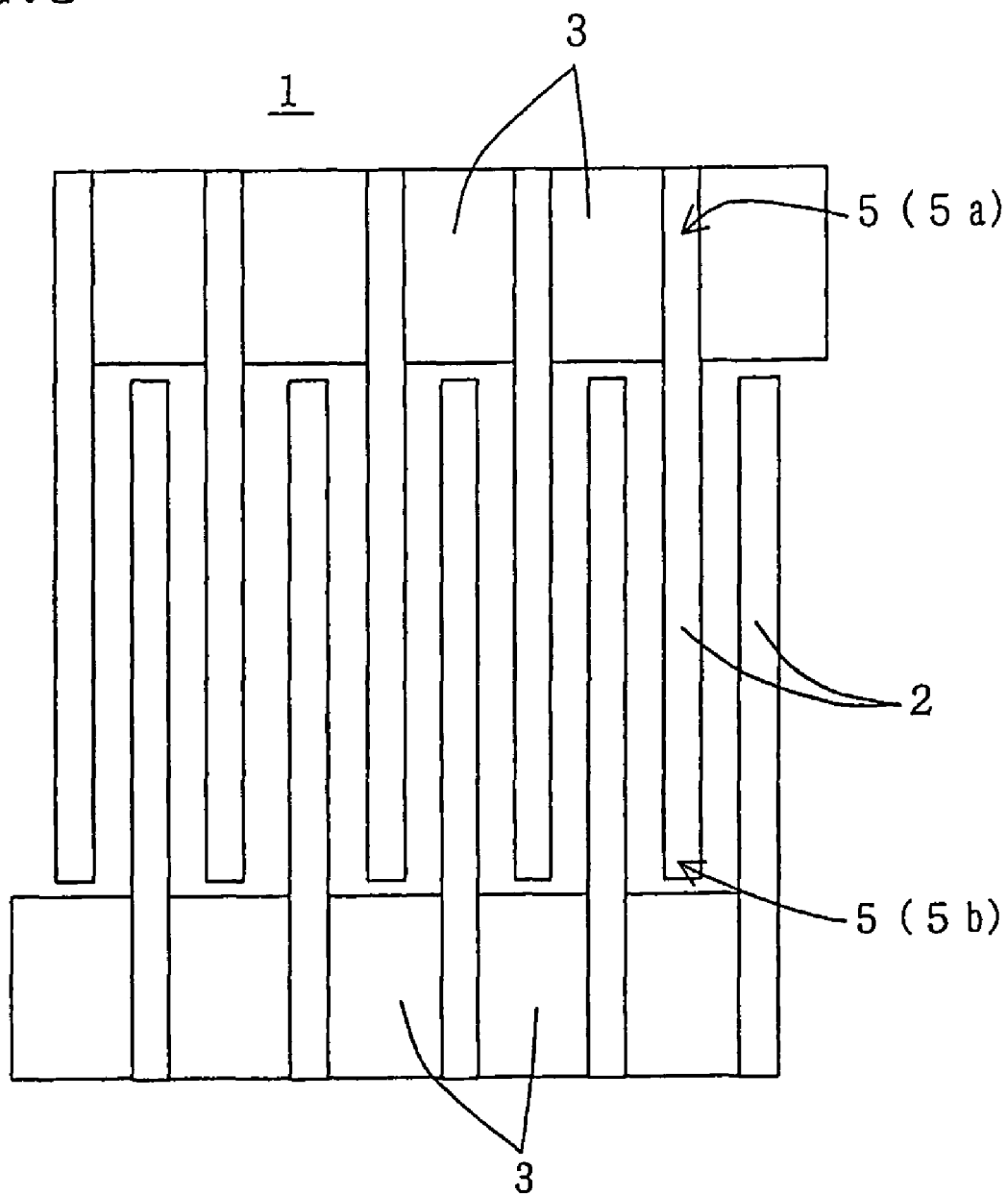
FIG. 3 is a schematic view showing constitution of another embodiment of a plasma generating electrode of the present invention.
Figure 4:
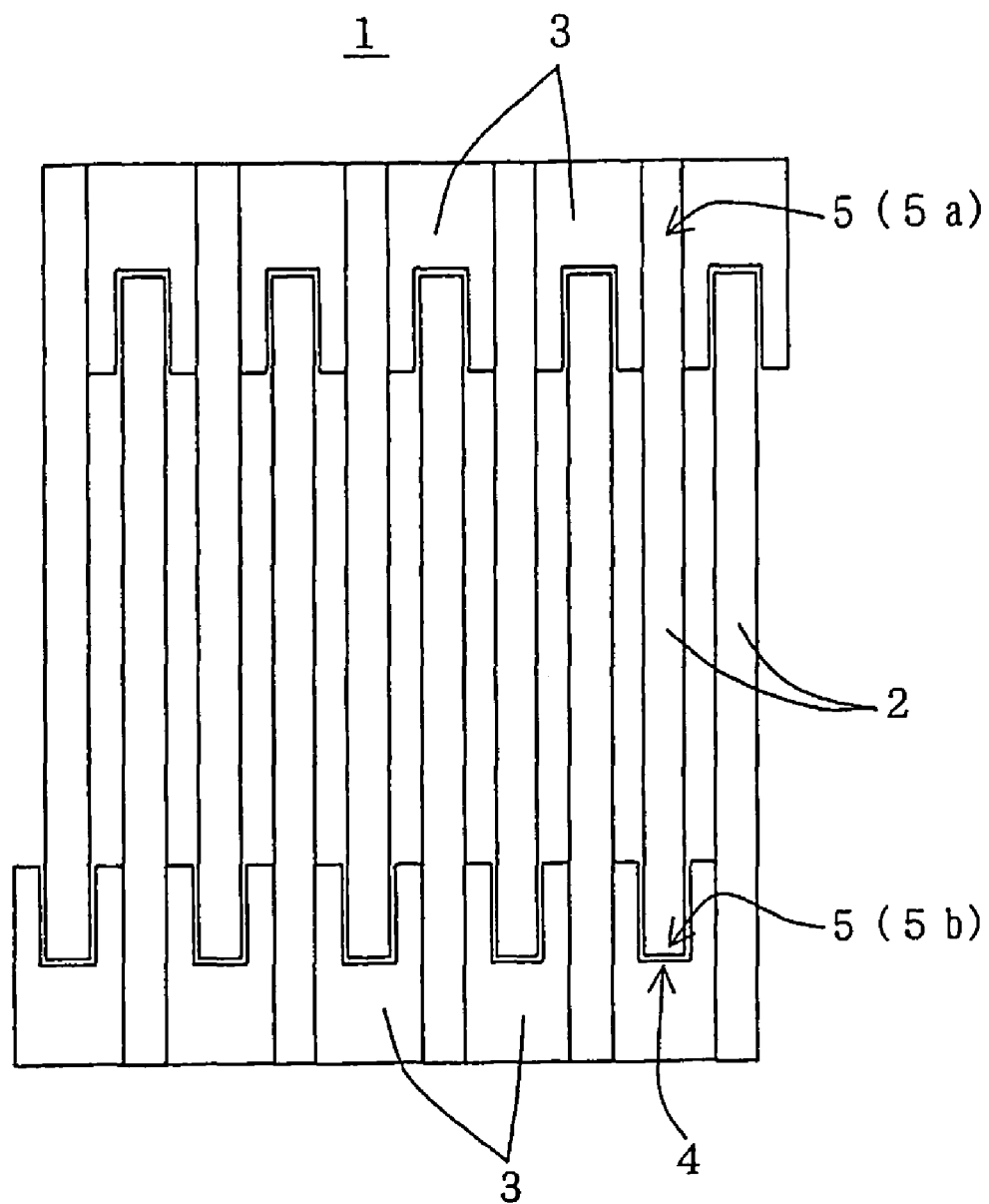
FIG. 4 is a schematic view showing constitution of another embodiment of a plasma generating electrode of the present invention.
Figure 5:
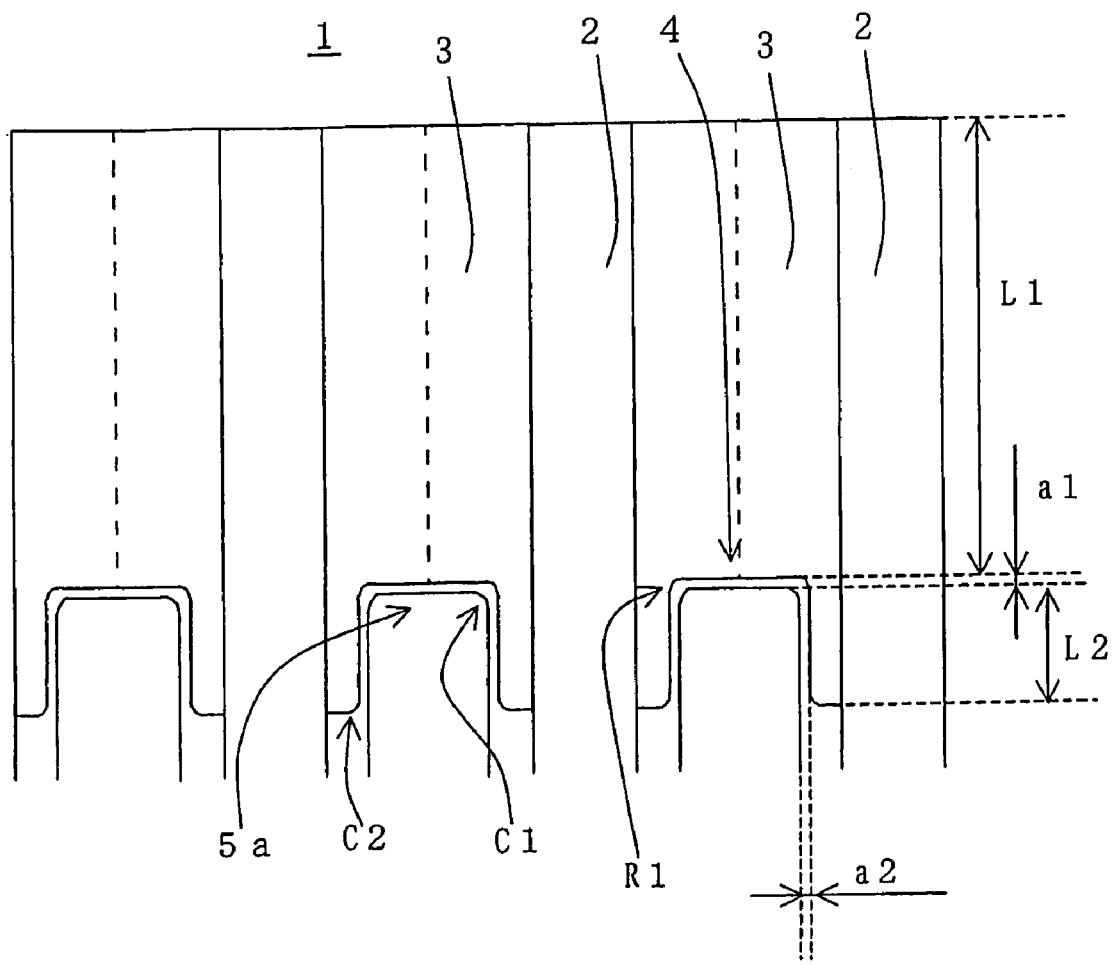
FIG. 5 is an enlarged view of holding members constituting an embodiment of a plasma generating electrode of the present invention and end portions of electrodes.

FIG. 1 is a schematic view showing constitution of an embodiment of a plasma generating electrode of the present invention. FIG. 2 is a schematic view showing constitution of the inside of an electrode used for an embodiment. FIGS. 3 and 4 are schematic views each showing constitution of another embodiment of a plasma generating electrode of the present invention. FIG. 5 is an enlarged view of holding members constituting an embodiment of a plasma generating electrode of the present invention and end portions of electrodes.

As shown in FIG. 1, a plasma generating electrode 1 of an embodiment is provided with two or more electrodes 2 disposed to face each other and holding members 3 holding the electrodes 2 at predetermined intervals and is capable of generating plasma by applying voltage between the electrodes 2, wherein at least one of the electrodes facing each other has a plate-shaped ceramic body 6 serving as a dielectric body and a conductive film 7 disposed inside the ceramic body 6, and the holding members 3 fix the opposite side end portions 5 (fixed end portions 5a) of the electrodes facing each other 2 in the state of a cantilever in such a condition that the electrodes are held by holding members in the state of cantilevers of the different directions alternately at a predetermined interval as a whole. Incidentally, though 10 sheets of electrodes 2 are held by holding members 3 in the plasma generating electrode 1 shown in FIG. 1, the number of electrodes 2 constituting a plasma generating electrode 1 is not limited to 10.

A plasma generating element 1 of the present embodiment can generate plasma between electrodes 2 disposed to face each other by applying voltage between the electrodes 2 and, for example, can react a component which can react by plasma and is contained in gas by sending the gas between the electrodes 2 disposed to face each other.

Since, in a plasma generating electrode 1 of the present embodiment, the holding members 3 fix the fixed end portions 5a of the electrodes facing each other 2 in the state of a cantilever in such a condition that the electrodes 2 are held by holding members in the state of cantilevers of the different directions alternately at a predetermined interval, it has relaxed thermal stress in comparison with a conventional plasma generating electrode, where both end portions of an electrode are held in a fixed state, and can effectively inhibit distortion or breakage of the electrodes 2 in accordance with thermal expansion, or the like. In addition, even in the case that the electrodes 2 disposed to face each other are made of different materials having different thermal expansion coefficients, thermal expansion of the electrodes is not suppressed, and therefore, distortion or breakage can effectively be prevented.

In a plasma generating electrode 1 shown in FIG. 1, any of the electrodes 2 has a plate-shaped ceramic body 6 serving as a dielectric body and a conductive-film 7 disposed inside the ceramic body 6. However, in the present invention, at least one electrode 2 may have a plate-shaped ceramic body 6 serving as a dielectric body and a conductive film 7 disposed inside the ceramic body 6. Thus, a plasma generating electrode 1 of the present embodiment is characterized by being a so-called barrier discharge type electrode, where at least one electrode has a ceramic body 6 and a conductive film 7. Since the barrier discharge type electrode is used, uniform plasma can be generated between the electrodes disposed to face each other, and it can suitably be used as a plasma reactor which cause a reaction by passing gas containing a predetermined component in plasma generated between the electrodes, for example, an ozonizer for purifying ozone by reacting oxygen contained in air or the like or an exhaust gas treating apparatus for treating exhaust gas. Incidentally, in the case that one of the electrodes facing each other is a barrier discharge type electrode, constitution of the other electrode is not particularly limited, and a conventionally known electrode, for example, a plate-shaped electrode made of metal having conductivity can be used, though the drawing is omitted. In addition, in plasma generating electrode 1 of the present embodiment, the holding members 3 has a large number of the first grooves 4, where the free end portions 5b are inserted with a predetermined gap, on each surface opposing the free end portions 5b opposite to fixed end portions 5b.

By the constitution where the holding members 3 has the first grooves 4 and the free end portions 5b are inserted into the first grooves 4 with a predetermined gap, edges of the free end portions 5b, where concentrated discharge is easily caused, are covered with the first grooves 4, and generation of non-uniform plasma between the electrodes 2 can effectively be prevented. In addition, though the free end portions 5b sometimes swing due to a vibration, amplitude of the free end portions 5b can be limited by the first grooves 4, and thereby breakage of the electrodes 2 can effectively prevented. Further, since there is a case that the conductive film 7 disposed inside the ceramic body 6 in at least one electrode 2 (all electrodes 2 in FIG. 1) does not reach the tip of the free end portion 5b, by inserting the free end portion 5b in the first groove 4 to cause discharge in the region other than the tip of the free end portion 5b, and thereby uniform plasma can be generated on a whole surface between the electrodes 2.

Incidentally, the first grooves 4 of the holding members 3 are not always necessary, and the holding members 3 constituting the plasma generating electrode 1 may simply hold the fixed end portion 5a of each electrode 2 with a surface opposing the free end portion 5b being formed in a plate shape as shown in, for example, FIG. 3.

In addition, as shown in FIG. 1, in a plasma generating electrode 1 of the present embodiment, a plurality of holding members 3 fix the fixed end portion 5a in such a manner that the fixed end portion 5a is interposed between the holding members 3. As shown in, for example, FIG. 6 as another embodiment, there may be employed a plasma generating electrode 41, where the holding members 43 each comprises a unitary first comb-shaped member 47 having the first grooves 44 as comb teeth and a unitary second comb-shaped member 48 having a second grooves 46 as comb teeth, the first comb-shaped member 47 and the second comb-shaped member 48 having shapes complementary to each other; the free end portions 45b of the electrodes 42 are inserted into the first grooves 44 of the first comb-shaped member 47; and the fixed end portions 45a of the electrodes 42 are fixed to the second grooves 46 of the second comb-shaped member 48 in the state of a cantilever. Such constitution makes fixation of the electrodes 42 easy. Incidentally, for the electrodes 42 shown in FIG. 6, there can suitably be used the same electrodes as the electrodes 2 constituting the plasma generating electrode 1 shown in FIG. 1.

Figure 6:
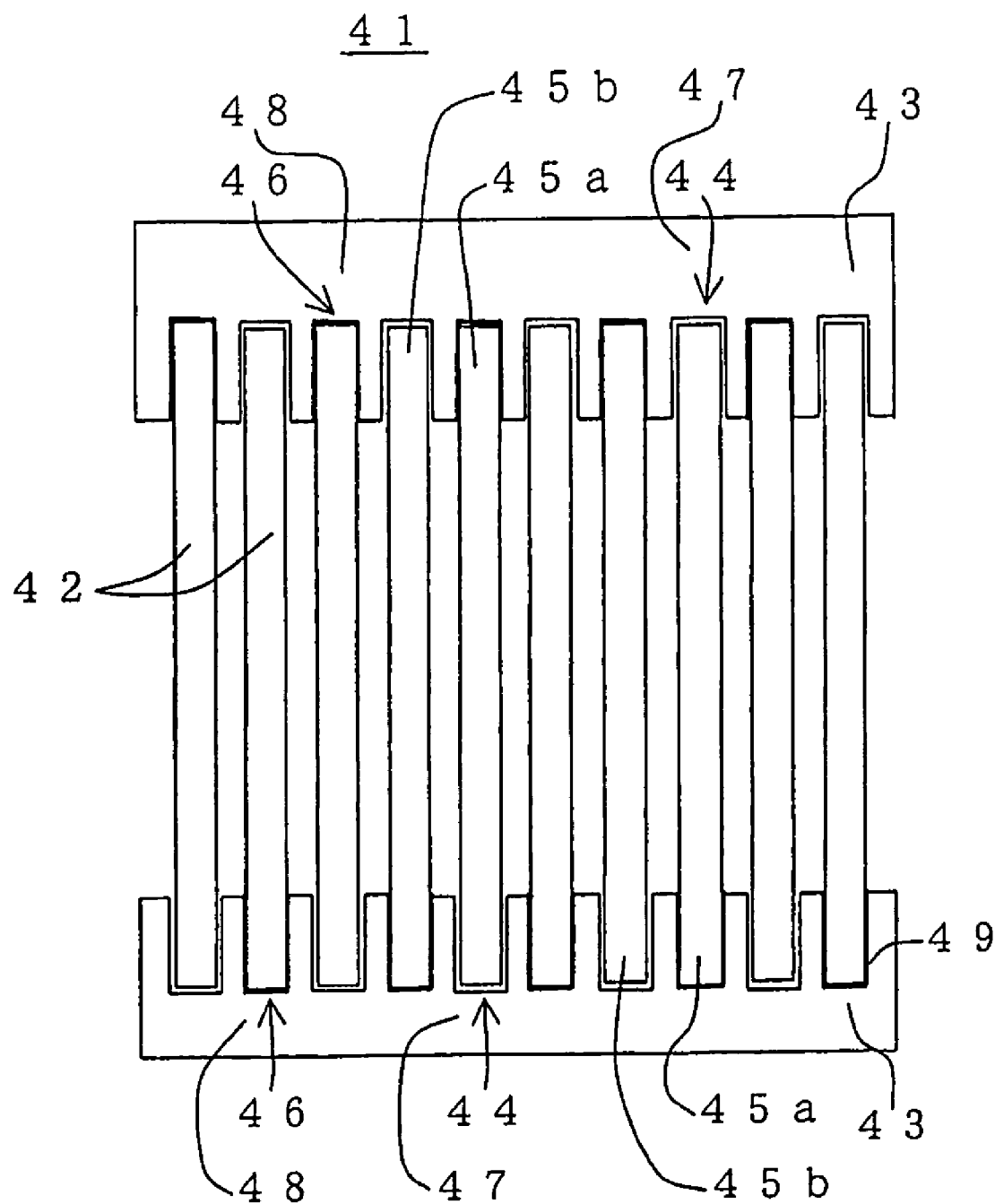
FIG. 6 is a schematic view showing constitution of another embodiment of a plasma generating electrode of the present invention.

In the plasma generating electrode 41 shown in FIG. 6, it is preferable that each of the fixed end portions 45a of the electrodes 42 is fixed, with an adhesive agent 49, to each of the second grooves 46 of the second comb-shaped member 48 in the state of a cantilever.

As the adhesive agent 49, there may suitably employed a solution or slurry being prepared by dissolving or suspending a powder of alumina or silica in a solvent such as, for example, an organic solvent or an aqueous solvent. When an adhesive agent 49 thus constituted is used, it is preferable that the adhesive agent 49 is filled into the gaps between the second grooves 46 of the second comb-shaped member 48 and the fixed end portions 45a of the opposing electrode 42, and then the adhesive agent is solidified by drying at fixed temperature.

In the case that the holding members 3 has the first grooves 4, it may be constituted so as to be separated into two parts at about the center thereof as shown in FIG. 1. By this constitution, the first grooves 4 constituting the holding members 3 can easily be formed, and the free end portions 5b of the electrodes facing each other 2 can easily be inserted into the first grooves 4. Needless to say, as shown in FIG. 4, the holding members 3 constituting the plasma generating electrodes 1 may be constituted by one member and hold the electrodes 2 alternately in the state of a cantilever.

As shown in FIGS. 1 and 5, the length L1 of a portion fixing each of the fixed end portions 5a of the holding members 3 is preferably 2 to 40 mm. When the length L1 is below 2 mm, it is sometimes difficult to hold the electrodes 2 in parallel to each other when the electrodes 2 are held with the fixed end portions 5a being fixed. When the length L1 is above 40 mm, the length of a portion which is not contributed to discharging, and the plasma generating electrode 1 becomes too larger and sometimes exceeds the allowable range in the point of size, mass, etc., when it is mounted on an automobile, or the like.

It is preferable that the distance a1 between the tip of each of the free end portions 5b of the electrodes 2 and a surface of the holding members 3 (surface opposing the tip of each the free end portions 5b of the first grooves 4 in the case that the holding members 3 have the first grooves 4) satisfies the relation of the following formula (1), for example, in the case that the electrodes facing each other 2 have thermal expansion coefficients of TE1 and TE2, respectively, at 0 to 600° C. and that the length from the fixed end portion 5a of the electrode 2 having a thermal expansion coefficient of TE1 to the free end portion 5b thereof is B:

$$abs(TE1-TE2) \times 600 \times B < a1 \qquad (1).$$

In the case that the holding members 3 have the first grooves 4, the depth L2 of the first grooves 4 is preferable 1 to 20 mm. When the depth L2 of the first grooves 4 is below 1 mm, the area where the electrode 2 hits of the side surface of the first grooves is too small upon collision of the electrode 2 due to a vibration, and wear loss sometimes becomes too much. When the depth L2 of the first grooves 4 is above 20 mm, the size of the whole electrodes 2 is too large with respect to the size of the discharge space, and electrode may be above the allowable range in the point of mountability, weight, etc. In addition, degree of freedom in deformation of the electrode 2 becomes small, and sometimes an effect for reducing holding power cannot be obtained sufficiently.

In the case that the holding members 3 have the first grooves 4, the distance a2 between the side surface of the free end portions 5b of the electrodes 2 and a surface opposing the side surface of the free end portions 5b of the first grooves 4 is preferably 0.02 to 0.6 mm, more preferably 0.02 to 0.1 mm. When the distance a2 is below 0.2 m, a side surface of the free end portion 5b is held by the first grooves 4 when the electrode 2 is thermally expanded, and an effect in relaxing thermal stress may not be obtained. When the distance a2 is above 0.6 mm, amplitude of vibrations of the electrode 2 under the environment for use is sometimes so large that deterioration of the electrode 2 due to repeated fatigue may increase. In addition, a collision speed when the electrodes 2 repeatedly collide with an internal surface of the first grooves 2 due to vibrations is too high, and it sometimes causes abrasion of the electrodes 2.

In the case that the holding members 3 have the first grooves 4, it is preferable that the first grooves 4 is formed in such a manner that the portion R1 corresponding with an angle of an internal surface constituting the first grooves 4 may have a predetermined curvature in order to reduce stress concentration inside the first grooves 4. Though a radius of curvature of the portion R1 corresponding with an angle of an internal surface is not particularly limited, the radius of curvature is preferably 0.1 to 0.5 mm.

In addition, it is preferable that the tip of the free end portion 5b of the electrode 2 is chamfered at an angle portion C1 so as to avoid interference with the first groove 4 where the tip is inserted. Though the size of the chamfering of the angle portion C1 is not particularly limited, a side preferably has a length of 0.1 to 0.5 mm. The angle portion C1 may be formed so as to have a curvature.

In addition, it is preferable that an angle portion C2 of the outer peripheral portion of the first groove 4 is chamfered to avoid chipping due to repeated collision of the electrode 2 due to vibrations. Though the size of the chamfering of the angle portion C2 is not particularly limited, a side preferably has a length of 0.1 to 1 mm. The angle portion C2 may be formed so as to have a curvature.

The main component of the holding member 3 used in the present embodiment is preferably alumina, silicon nitride, sialon, cordierite, or mullite. In the present embodiment, the main component means a component accounting for 60% by mass of all the components. Such holding members 3 is preferably electrically insulated from the viewpoint of inhibiting local discharge along a surface and has a small thermal expansion coefficient to avoid breakage due to thermal stress.

As shown in FIG. 1, the conductive film 7 used for the electrode constituting the plasma generating electrode 1 of the present invention preferably contains metal excellent in conductivity as the main component. Suitable example of the conductive film 7 is at least one kind of metal selected from a group consisting of tungsten, molybdenum, manganese, chromium, titanium, zirconium, nickel, iron, silver, copper, platinum, and palladium. In the present embodiment, the main component means a component accounting for at least 60% by mass of all the components. In the case that the conductive film 7 contains two kinds or more of metals among the above group as the main component, the sum of the metals accounts for at least 60% by mass of all the components.

The conductive film 7 has a thickness of preferably 0.01 to 0.1 mm, more preferably 0.01 to 0.015 m, for the reason of miniaturization of the plasma generating electrode 1, reduction in resistance of fluid which is allowed to pass between the electrodes 2, or the like, in the case of treating exhaust gas or the like.

The above conductive film 7 is preferably disposed on a tape-shaped ceramics formed body by coating. Suitable examples of the coating method include screen printing, calendar rolling, spraying, electrostatic coating, dipping, knife coater, chemical vapor deposition, and physical vapor deposition. According to such a method, a thin conductive film 7 having excellent flatness and smoothness of a surface after the coating can easily be formed.

When the conductive film 7 is coated on a ceramics formed body, the conductive film can be formed by preparing a conductive paste by mixing a metal powder as the main component of the conductive film 7 with an organic binder, and a solvent such as terpineol and coating the conductive past on a tape-shaped ceramic formed body in the above method.

By adding the same component as the ceramic body 6 to the metal component of the conductive film 7, adhesion between the conductive film 7 and the ceramic body 7 can be improved. In addition, a glass component may be added to the ceramic body component which is added to the metal component. Addition of a glass component improves sinterability of the conductive film 7, and thereby densification in addition to adhesion is improved. The sum total of a component of a ceramic body 6 and/or a glass component other than the metal component is preferably 30% by mass or less. When it exceeds 30% by mass, the resistance value is lowered, and sometimes a function as the conductive film 7 cannot be obtained.

The plate-shaped ceramic body 6 constituting the electrode 2 has a function as a dielectric body as described above. The conductive film 7 is used in a condition that it is disposed inside of the plate-shaped ceramic body 6, thereby a partial discharge such as a spark is reduced in comparison with the case of discharging only by the conductive film 7, and it enables to cause small discharge in a plurality of sites. Since a current is small in the small discharge in a plurality of sites in comparison with discharge such as a spark, electricity consumption can be reduced, and since a dielectric body is present, a current flowing between the electrodes 2 is regulated, and thereby generating nonthermal plasma with less energy consumption without temperature rise.

The plate-shaped ceramic body 6 preferably has a material having high permittivity, and suitable examples of the material include aluminum oxide, zirconium oxide, silicon oxide, cordierite, mullite, titanium-barium based oxide, magnesium-calcium-titanium based oxide, barium-titanium-zinc based oxide, silicon nitride, and aluminum nitride. By using a material having excellent thermal shock resistance, the plasma generating electrode 1 can be used even in a high-temperature condition. In the case of using a material having high permittivity, it is possible to make the electrode 2 smaller because of high discharge efficiency, and generation of thermal stress due to large thermal expansion can be reduced.

Though thickness of the tape-shaped ceramic formed body in the case of forming a tape-shaped ceramic body 6 by a tape-shaped ceramic formed body is not particularly limited, it is preferably 0.1 to 3 mm. When the thickness of the tape-shaped ceramic formed body is below 0.1 mm, electrical insulation between the electrodes 2 cannot be secured. When the thickness of the tape-shaped ceramic formed body is above 3 mm, it exceeds a thickness required as a dielectric body and sometimes hinders space saving.

As the tape-shaped ceramic formed body, a ceramic green sheet for a ceramic substrate can suitably be used. The ceramic green sheet can be formed by slurry or paste for producing a green sheet so as to give a predetermined thickness in accordance with a conventionally known method such as doctor blading, calendaring, printing, or reverse roll coater. The ceramic green sheet formed in such a manner may be subjected to cutting, trimming, punching, forming of communicating hole, etc., or a plurality of the ceramic green sheets laminated may be subjected to thermocompression bonding to give a unitary laminate.

As the above slurry or paste for producing a green sheet, there may suitably be used one prepared by blending a suitable binder, sintering aid, plasticizer, dispersant, organic solvent, etc., with a predetermined ceramic powder. Suitable examples of the ceramic powder include powders of alumina, mullite, cordierite, silicon nitride, aluminum nitride, ceramic glass, and glass. In the case of alumina, suitable examples of the sintering aid include silicon oxide, magnesium oxide, calcium oxide, titanium oxide, and zirconium oxide. Incidentally, 3 to 10 parts by mass of the sintering aid is preferably added with respect to 100 parts by mass. As the plasticizer, dispersant, and organic solvent, ones used in a conventionally known method can suitably be used.

As the ceramic body 6 used in the present embodiment, a ceramic sheet produced by extrusion molding can suitably be used. There may be used, for example, a plate-shaped ceramic formed body produced by adding a forming aid such as methyl cellulose, a surfactant, etc., to the above ceramic powder to give a mixture, which is then kneaded and extruded through a predetermined die.

The plate-shaped ceramic body 6 has a porosity of preferably 0.1 to 35%, and more preferably 0.1 to 10%. By such constitution, plasma can effectively be generated between the electrodes facing each other 2, and energy saving can be realized.

Figure 7:
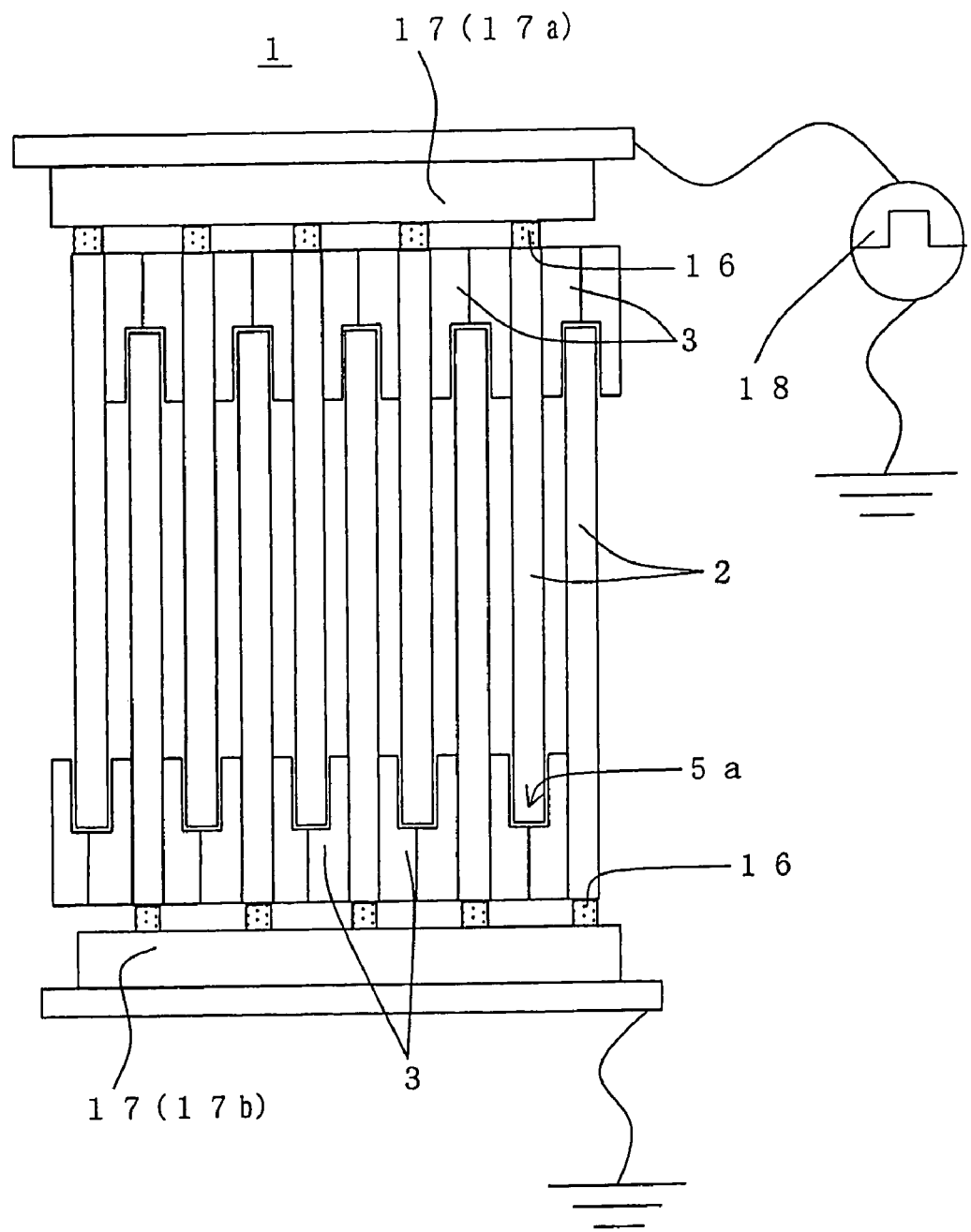
FIG. 7 is a schematic view showing constitution of another embodiment of a plasma generating electrode of the present invention.

It is preferable that a plasma generating electrode 1 of the present embodiment is further provided with a connection terminal 16 for electrical connection to the fixed end portion 5a of each electrode 2 as shown in FIG. 7. By such constitution, electrical connection can be secured without influencing a space where discharge is caused. The main component of the connection terminal 16 is preferably metal having a thermal expansion coefficient of $7 \times 10^{-6}$ (1/K) or less at 0 to 600° C. By such constitution, electrical connection can be secured. Without this structure, there sometimes arise problems of inferior contact, electric loss such as heat generation due to insufficient conductivity, insufficient generation of plasma, etc. It is preferably that a material for the connection terminal 16 has a thermal expansion coefficient close to that of alumina which is one of the main components of the dielectric body constituting the electrode 2, and suitable examples of the material include kovar and Ni—Fe based low thermal expansion alloy.

The connection terminal 16 is preferably connected to each fixed end portions 5a of electrodes facing each other 2 by welding, brazing, or diffusion bonding. By such constitution, electric connection can be secured, and it can realize electrical connection having strength property maintained in the environment for use and in a vibrating condition.

In addition, in the plasma generating electrode 1 shown in FIG. 7, current collecting members 17a, 17b for feeding an electric current to the connection terminals 16 connected on the same direction side at once are disposed respectively on the connection terminals 16 connected to the fixed end portion 5a of each electrode 2 so as to feed a current to each electrode 2 easy. For these current collecting members 17, a conductive material such as a wire mesh, for example, stainless steel may suitably be used. In addition, it is preferable to subject the current collecting member 17 to gold plating in order to maintain conductivity. Incidentally, a power source 18 is electrically connected to the current collecting member 17a, and the current collecting member 17b is grounded.

Figure 8:
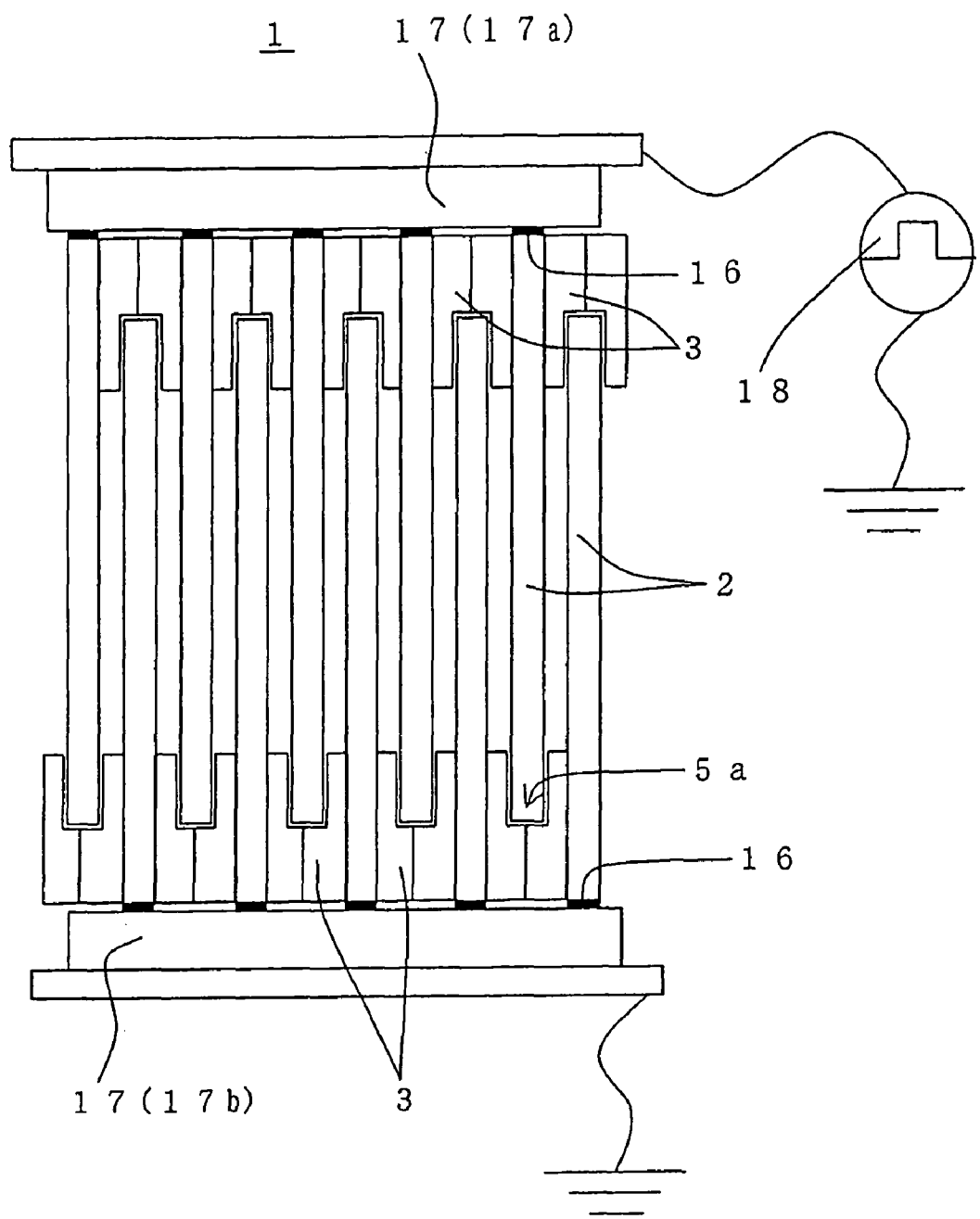
FIG. 8 is a schematic view showing constitution of another embodiment of a plasma generating electrode of the present invention.

The connection terminal 16 is not limited to one having the aforementioned constitution. For example, as shown in FIG. 8, the connection terminal 16 may be formed by plating of a conductive layer applied on the fixed end portion 5a of each electrode 2. The connection terminal 16 constituted by plating of a conductive layer can obtain a functional effect similar to that of the connection terminal 16 shown in FIG. 7. Also, in a plasma generating electrode 1 shown in FIG. 8, current collecting members 17a, 17b for applying an electric current to the connection terminals 16 connected on the same direction side at once are disposed respectively on the connection terminals 16 connected to the fixed end portion 5a of each electrode 2. A power source 18 is electrically connected to the current collecting member 17a, and the current collecting member 17b is grounded. As the current collecting member 17, one similar to the current collecting member 17 shown in FIG. 7 can suitably be used.

A method for producing a plasma generating electrode of the present embodiment will hereinafter be described specifically.

A ceramic green sheet for the above ceramic body is formed. To at least a kind of material selected from the group consisting of, for example, alumina, mullite, ceramic glass, zirconia, cordierite, silicon nitride, aluminum nitride, and glass are added a sintering aid, a binder of butyral based resin, cellulose based resin, or the like, a plasticizer such as DOP and DBP, an organic solvent such as toluene and butadiene, etc., to give a mixture. The mixture is sufficiently mixed using an alumina pot and an alumina ball to prepare slurry for a green sheet. Alternatively, this may be prepared by mixing these materials by a ball mill with a monoball.

Next, the slurry for a green sheet is defoamed by stirring under reduced pressure, and viscosity of the slurry is adjusted to give a predetermined one. The slurry for a green sheet adjusted in this manner is formed in a tape shape by a tape-forming method such as doctor blading to form an unfired ceramic body.

Meanwhile, a conductive paste is prepared for forming a conductive film disposed on a surface of the obtained unfired ceramic body. The conductive paste can be prepared by adding a binder and a solvent such as terpineol and sufficiently kneading the mixture using a triroll mill.

The conductive paste thus prepared is printed by screen printing or the like on a surface of an unfired ceramic body to form a conductive film having a predetermined shape. Incidentally, the conductive film is printed so as to be disposed extendedly up to an outer peripheral portion of the unfired ceramic body to secure a conductive portion from outside so that electricity can be fed to the conductive film from outside after the conductive film is held by the ceramic body.

Next, the unfired ceramic body having a printed conductive film and another unfired ceramic body are laminated in such a manner that the printed conductive film is covered. When the unfired ceramic bodies are laminated, it is preferable to laminate them with pressing them under a pressure of 10 MPa at 100° C.

Next, the laminated unfired ceramic bodies are fired in a condition that the conductive film is held by them to form an electrode having a plate-shaped ceramic body for functioning as a dielectric body and a conductive film disposed inside the ceramic body.

Then a holding member for holding the obtained electrode is formed. A holding member used in the present embodiment can be produced by subjecting a mixed powder of alumina raw material powder and an organic binder with an alumina content of 90% or more in a final fired body to press molding, binder calcination, main firing, and finishing for size adjustment by grinding as necessary. However, it is not limited to this as long as it has necessary strength. The necessary strength is preferably 30 MPa or more, more preferably 300 MPa or more by four point bending strength according to JISR1601. When it is below 30 MPa, the holding member sometimes breaks by external force due to bearing of a fixing mat for fixing four sides of the holding member.

The electrodes having a dielectric body obtained in the aforementioned method and electrodes facing each other are held alternately in different directions by the holding members in the condition of a cantilever to produce a plasma generating electrode. At this time, as the opposing electrode, the electrode having a dielectric body obtained in the aforementioned method may be used, or a conventionally known electrode may be used. When the holding member has the first groove, each electrode is held in the condition that a free end portion of the electrode adjacent to the first groove is inserted.

Figure 9:
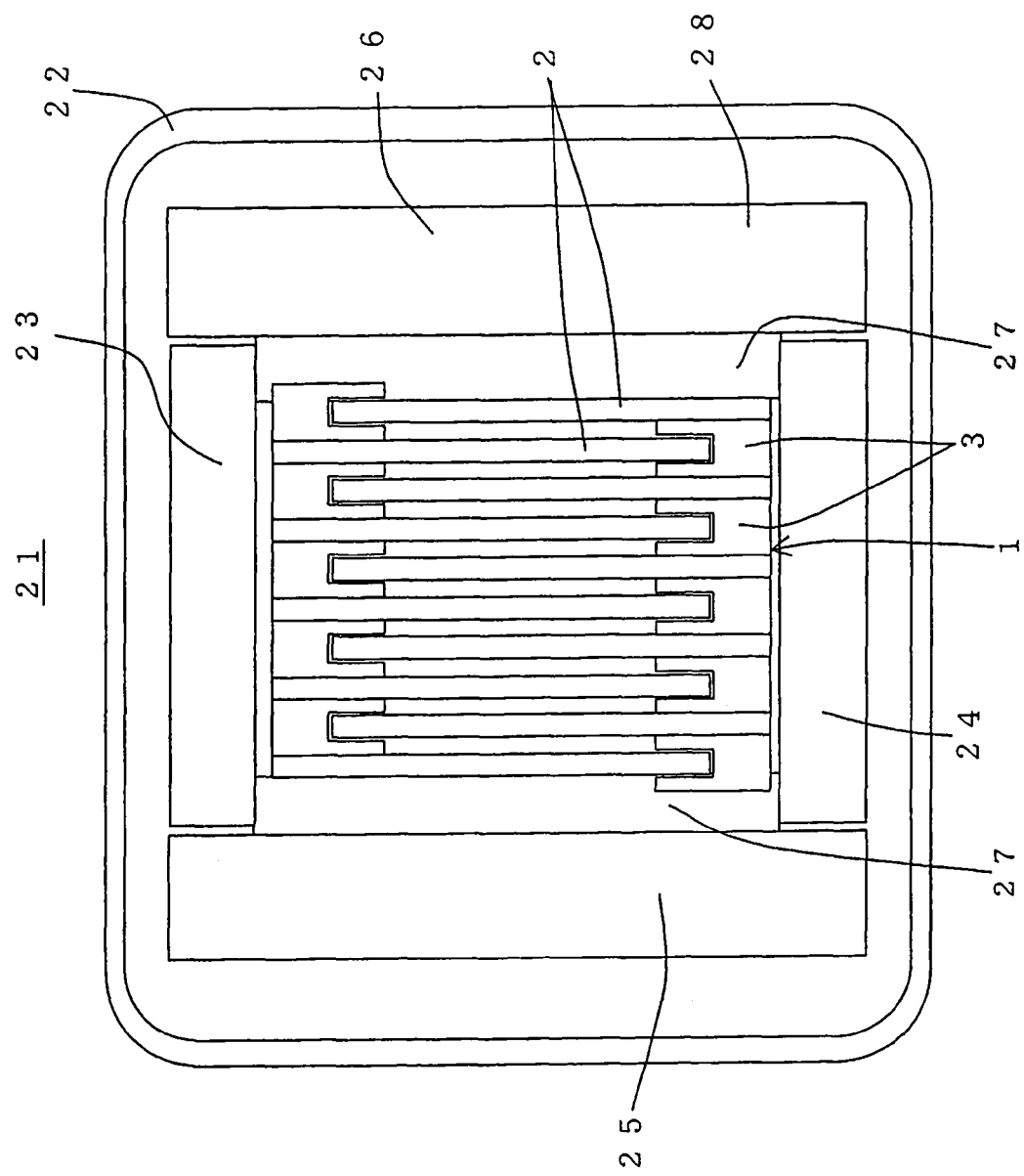
FIG. 9 is a sectional view taken along a plane perpendicular to a gas-flow direction and perpendicular to a surface of electrodes constituting a plasma generating electrode in an embodiment of a plasma reactor of the present invention.

Next, an embodiment of a plasma reactor of the present invention will be described. FIG. 9 is a sectional view taken along a plane perpendicular to a gas-flow direction and perpendicular to a surface of electrodes constituting a plasma generating electrode in an embodiment of a plasma reactor of the present invention.

As shown in FIG. 9, a plasma reactor 21 of the present embodiment is provided with an embodiment (plasma generating electrode 1) of a plasma generating electrode of the present invention shown in FIG. 1 and a case body 22 having a passage of gas containing a predetermined component. When the gas is introduced inside the case body 22, a predetermined component contained in the gas can be reacted by plasma generated by the plasma generating electrode 1. A plasma reactor 21 of the present embodiment can suitably be used for an exhaust gas treating apparatus, an ozonizer for purifying ozone by reacting oxygen contained in air or the like, etc. In particular, since a plasma reactor of the present embodiment is provided with an embodiment (plasma generating electrode 1) of a plasma generating electrode of the present invention, thermal stress is relaxed, and it can particularly suitably used for a treating apparatus for treating high-temperature gas exhausted from an engine, an incinerator, or the like.

Though a material for the case body 22 constituting a plasma reactor 21 of the present embodiment is not particularly limited, it is preferably ferrite based stainless steel, or the like, which has excellent conductivity, is light and inexpensive, and has little deformation due to thermal expansion.

A plasma reactor 21 of the present embodiment is further provided with a press member 27 for fixing the electrodes 2 at both ends by pressing the electrodes 2 in a direction perpendicular to a surface of each electrode 2 and four frames 23, 24, 25, and 25 for fixing four surfaces (upper, lower, left, and right) other than a surface where exhaust gas or the like actually passes in the condition that the holding members 3 hold the electrodes 2 constituting the plasma generating electrode 1. By the press member 27 and the frames 23, 24, 25, and 26, the plasma reactor 21 is disposed inside the case body 22.

For the press member 27, there may suitably be used alumina, silicon nitride, sialon, SiC, cordierite, mullite, or the like. For the frames 23, 24, 25, and 26, there may suitably be used a metal having low thermal expansion such as a ferrite based stainless steel, Ni—Fe based alloy, kovar, inconel, and incoloy or a ceramic containing, as the main component, alumina, silicon nitride, sialon, SiC, cordierite, or mullite.

It is preferable to interpose a fixing mat for fixing the frames 23, 24, 25, 26 between the frames 23, 24, 25, 26 and the case body 22. As the fixing mat 28, there can suitably be used a buffer such as a silica fiber having an insulating property and thermal resistance. It is preferably that the fixing mat 28 presses the frames 23, 24, 25, 26 with a pressure of about 0.1 to 1 MPa. Though FIG. 9 shows a plasma generating electrode 1 constituted by 10 sheets of electrodes 2, the number of the electrodes 2 is not limited to 10.

Figure 10:
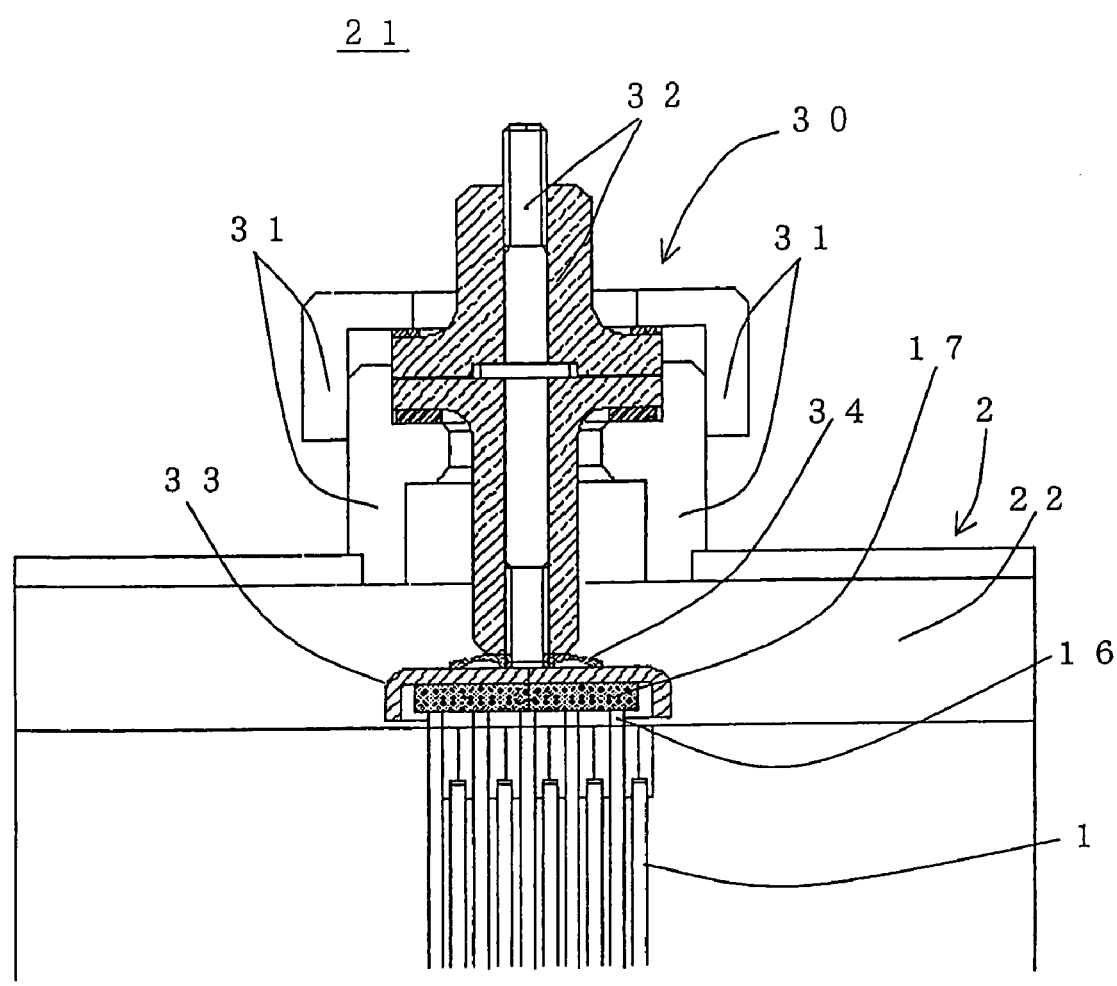
FIG. 10 is a schematic view showing constitution of another embodiment of a plasma reactor of the present invention.

In the case that the plasma generating electrode 1 constituting the plasma reactor 21 is provided with a connection terminal 16 and a current collecting member 17 as shown in FIGS. 7 and 8, it is preferable that the plasma reactor 21 is provided with an external terminal 30 for electrical connection to the current collecting member 17 from outside the case body 22 as shown in FIG. 10. The external terminal 30 is constituted by an insulation portion 31 constituting the outside of the external terminal 30, a conductive portion 32 constituting the inside of the external terminal 30, a press cap 33 for pressing the current collecting member 17 connected to the connection terminal 16 of the plasma generating electrode 1, a flat spring 34 for fixing the press cap 33 disposed on the central axis of the conductive portion 32. The thus constituted external terminal 30 can maintain electrical connection even in the case that temperature difference in each portion, difference in thermal expansion due to difference in thermal expansion coefficient of the materials, or a relative positional relation of the case body 22 and the plasma generating electrode 1 is changed by vibrations or the like.

The insulation portion 31 constituting the external terminal 30 can be formed by the use of a material having excellent electric insulation, such as alumina, zircon, silicon nitride, or SiC. The conductive portion 32 can be formed by the use of stainless steel, or the like, which is excellent in conductivity. The press cap 33 and the flat spring 34 are preferably formed by the use of stainless steel.

A plasma reactor of the present embodiment may further be provided with a power source for applying voltage to plasma generating electrodes. As this power source, a conventionally known power source can be used as long as it can feed a current capable of effectively generating plasma.

A plasma reactor of the present embodiment may have constitution of not having a power source as described above but feeding a current from a power source outside.

A current fed to a plasma generating electrode used in the present invention can be determined by suitable selection depending on intensity of plasma. For example, in the case that a plasma reactor is disposed in an exhaust gas system of an automobile, it is preferable that a current fed to the plasma generating element is a direct current with a voltage of 1 kV or more, a pulse current with the pulse repetition rate of 100 or more (100 Hz or more) per second with a peak voltage of 1 kV or more, an alternating current with a frequency of 100 or more (100 Hz or more) with a peak voltage of 1 kV or more, or a current obtained by combining two of them.

Figure 11:
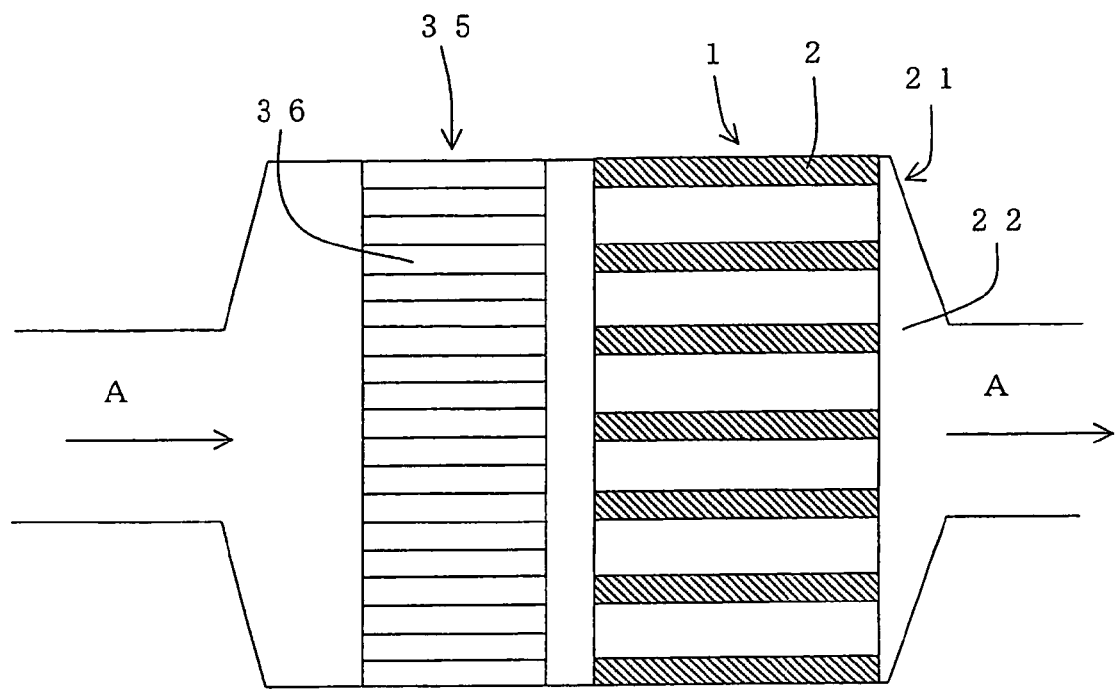
FIG. 11 is a sectional view taken along a plane including a gas-flow direction and perpendicular to a surface of electrodes constituting a plasma generating electrode in another embodiment of a plasma reactor of the present invention.

As shown in FIG. 11, the plasma reactor 21 may be provided with a honeycomb structure 35 having a plurality of cells 36 separated by partition walls on upstream side of a position where the plasma generating electrode 1 is disposed in a passage of the case body 22. By this constitution, a sudden temperature change of the plasma generating electrode 1 can be prevented by once passing high-temperature exhaust gas, or the like, through the inside of the honeycomb structure 35 at the time of making the exhaust gas react. In the case of using the honeycomb structure 35 as a filter, a foreign substance contained in exhaust gas or the like can be removed, and breakage of the plasma generating electrode 1 can be prevented. Here, FIG. 11 is a sectional view taken along a plane including a gas-flow direction and perpendicular to a surface of electrodes 2 constituting a plasma generating electrode 1 in a plasma reactor 21 of the present embodiment. The arrow A shown in FIG. 11 shows the gas-flow direction.

The honeycomb structure 35 preferably contains, as the main component, at least one kind of ceramic material selected from the group consisting of cordierite, alumina, mullite, silicon nitride, sialon, and zirconia. The honeycomb structure 35 has a cell density of preferably 15 to 186 cells/cm$^2$, more preferably 40 to 70 cells/cm$^2$. When the cell density is below 15 cells/cm$^2$, sometimes an effect in removing a foreign substance cannot be obtained. When the cell density is above 186 cells/cm$^2$, a cell is sometimes clogged. In addition, the honeycomb structure 35 has a porosity of preferably 5 to 36%, more preferably 20 to 40%. When the porosity is above 36%, heat capacity is not sufficient, and an effect in leveling of gas temperature is sometimes insufficient. When the porosity is below 5%, rigidity of the material is too high, and durability to thermal stress is sometimes insufficient. Moreover, it is preferable that the thickness of the ribs (thickness of partition walls), which with contains cordierite as the main component is 50 to 400 μm.

The present invention is hereinafter described specifically with referring to Examples. However, the present invention is by no means limited to these Examples.

Example 1

There was produced a plasma reactor (Example 1) provided with a plasma generating electrode where the electrodes facing each other has a plate-shaped ceramic body serving as a dielectric body and a conductive film disposed inside the ceramic body, and the holding members fix the opposite side end portions (fixed end portions) of the electrodes facing each other in the state of a cantilever in such a condition that the electrodes are held by holding members in the state of cantilevers of the different directions alternately at a predetermined interval as a whole.

Test gas having a nitrogen monoxide concentration of 200 ppm was sent into the case body constituting the plasma reactor for one hour with changing the gas temperature from room temperature to 600° C. at 10 minute intervals with the maximum space velocity (SV) of 400,000 (l/hr) in the condition that plasma is generated in a plasma generating electrode constituting electrode using a pulse power source having a voltage of 3 to 7 kV and the pulse repetition rate of 200 to 2000 times/sec.

Though thermal expansion and contraction was actively caused in the plasma generating electrode constituting the plasma reactor of the present Example during passing the test gas, there was no breakage or the like because thermal stress was relaxed since each electrode was held in the condition of a cantilever. In addition, in the test gas passed through the plasma of the present Example, about 85% of nitrogen monoxide was oxidized to give nitrogen dioxide, and the good results were obtained.

Combustion gas of a propane gas burner (gas temperature of about 700° C.) and air for cooling (gas temperature of about 20° C.) was sent to the plasma reactor of the present Example with switching at 10 minute intervals with a gas-flow rate of 1 $Nm^3$/min. No breakage of the electrode was caused due to thermal stress even for a repeated temperature change between heating and cooling, and it was confirmed that the plasma reactor of the present Example can continuously or intermittently treat high-temperature gas.

INDUSTRIAL APPLICABILITY

As described above, since holding members hold electrodes in the state of cantilevers of the different directions alternately at a predetermined interval as a whole in a plasma generating electrode of the present invention, the plasma generating electrode relaxes the thermal stress and effectively prevents distortion and breakage of the electrode caused by a temperature change even in the case that a temperature change is locally generated to the plasma generating electrode due to high-temperature exhaust gas discharged from, for example, an automobile engine.

Further, a plasma reactor of the present invention can generate uniform and stable plasma since it is provided with such a plasma generating electrode, and it can be used for various kinds of gas since it is excellent in thermal resistance.

The invention claimed is:

1. A plasma generating electrode comprising:
   two or more electrodes disposed to face each other, each of the electrodes having both a fixed end portion and a free end portion;
   holding members for holding the electrodes at a predetermined interval, and capable of generating plasma by applying voltage between the electrodes; and
   a connection terminal for electrical connection to the fixed end portions of the electrodes, wherein a main component of the connection terminal is metal having a thermal expansion of coefficient of $7 \times 10^{-6}$(1/K) at 0 to 600° C. or less;
   wherein at least one of the electrodes facing each other has a plate-shaped ceramic body serving as a dielectric body and a conductive film disposed inside the ceramic body,
   the holding members fix the fixed end portions of the electrodes facing each other in the state of a cantilever in such a condition that the electrodes are held by the holding members in the state of cantilevers of the different directions alternately at a predetermined interval as a whole, and
   the holding members have a large number of first groove portions to insert the free end portions opposite to the fixed end portions of the electrodes therein with a predetermined gap on each surface opposing to the free end portions.

2. A plasma generating electrode according to claim 1, wherein the holding members each comprises a unitary first comb-shaped member having the first grooves as comb teeth and a unitary second comb-shaped member having a second grooves as comb teeth, the first comb-shaped member and the second comb-shaped member having shapes complementary to each other; the free end portions of the electrodes are inserted into the first grooves of the first comb-shaped member; and the fixed end portions of the electrodes are fixed to the second grooves of the second comb-shaped member in the state of a cantilever.

3. A plasma generating electrode according to claim 2, wherein each of the fixed end portions of the electrodes is fixed, with an adhesive agent, to each of the second grooves of the second comb-shaped member in the state of a cantilever.

4. A plasma generating electrode according to claim 1, wherein the connection terminal is connected to the fixed end portions of the electrodes by welding, brazing, or diffusion bonding.

5. A plasma generating electrode according to claim 1, wherein the connection terminal is formed by plating of a conductive layer on the fixed end portions of the electrodes.

6. A plasma reactor comprising a plasma generating electrode comprising:
   two or more electrodes disposed to face each other, each of the electrodes having both a fixed end portion and a free end portion, holding members for holding the electrodes at a predetermined interval, capable of generating plasma by applying voltage between the electrodes, and a honeycomb structure having a plurality of cells separated by partition walls and disposed on upstream side of the plasma generating electrode in the passage of a case body, the honeycomb structure having a cell density of 15 to 186 cells/$cm^2$;
   wherein at least one of the electrodes facing each other has a plate-shaped ceramic body serving as a dielectric body and a conductive film disposed inside the ceramic body,
   the holding members fix the fixed end portions of the electrodes facing each other in the state of a cantilever in such a condition that the electrodes are held by the holding members in the state of cantilevers of the different directions alternately at a predetermined interval as a whole and the case body having a passage of gas containing a predetermined component, and being capable of making the predetermined component contained in the gas react with plasma generated by the plasma generating electrode when the gas is introduced into the case body, and
   the holding members have a large number of first groove portions to insert the free end portions opposite to the fixed end portions of the electrodes therein with a predetermined gap on each surface opposing to the free end portions.

* * * * *